Dec. 22, 1925.  1,566,994

L. SPIRO ET AL

SCALE

Filed June 11, 1924

L. Spiro
E.T. White
INVENTOR

BY Victor J. Evans
ATTORNEY

WITNESS:

Patented Dec. 22, 1925.

1,566,994

UNITED STATES PATENT OFFICE.

LEON SPIRO AND EDWARD T. WHITE, OF EVERETT, WASHINGTON.

SCALE.

Application filed June 14, 1924. Serial No. 719,401.

*To all whom it may concern:*

Be it known that we, LEON SPIRO and EDWARD T. WHITE, citizens of the United States, residing at Everett, in the county of Snohomish and State of Washington, have invented new and useful Improvements in Scales, of which the following is a specification.

This invention relates to egg scales and has for an object the provision of means whereby eggs of different weight may be readily graded.

A further object of the invention resides in the provision of indicating means on the scale to readily indicate the exact weight, size and class of eggs, as it seems to be a common practice among farmers and merchants to sell eggs of various sizes and weights at different prices.

With the above and other objects in view, the invention further includes the following novel features and details of construction, to be hereinafter more fully described, illustrated in the accompanying drawings and pointed out in the appended claims.

In the drawings:—

Figure 1:
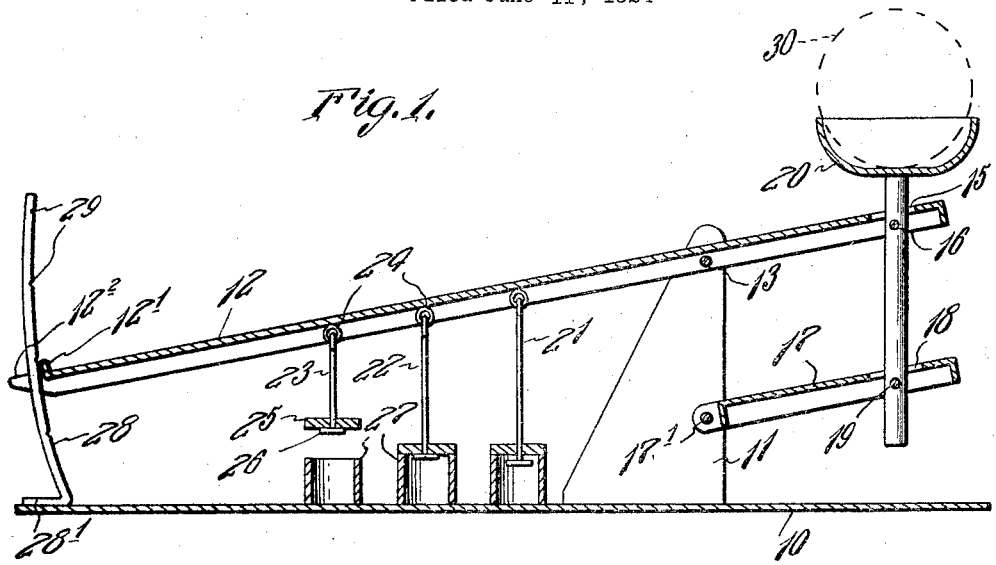
Figure 1 is a longitudinal sectional view of the invention.
Figure 2:
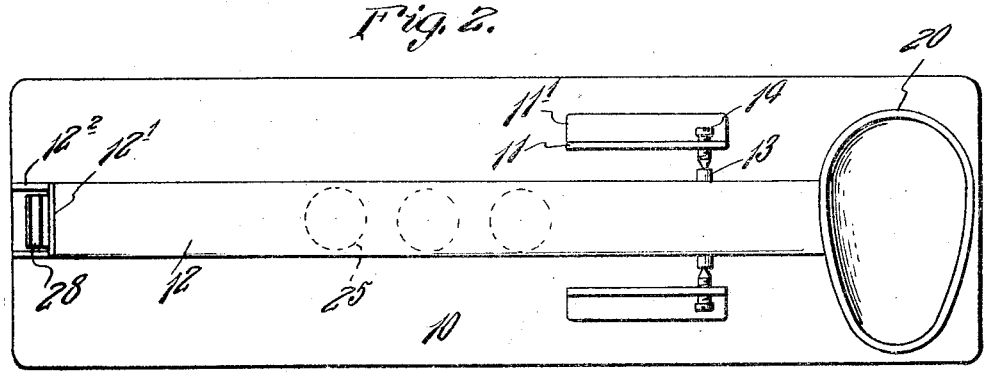
Figure 2 is a top plan view of the invention.
Figure 3:
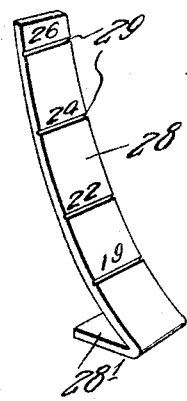
Figure 3 is a perspective of the gage.
Figure 4:
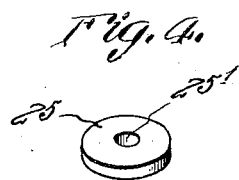
Figure 4 is a perspective of one of the weights.

Referring in detail to the drawings, wherein like characters of reference denote corresponding parts, the reference character 10 indicates the flat base portion of the scale. This base has spaced parallel supports 11 extending from the upper face of the base 10 provided with legs 11' suitably secured to the base 10. A scale beam 12 having lugs 13 positioned off center and extending from opposite sides thereof adapted to be pivotally secured between the arms 11 through the medium of adjusting pins 14 extending from the arms 11 and engaging the lugs 13. The long arm of the beam 12 is bifurcated to provide spaced guide arms 12² and an upstanding ledge 12', the purpose of which will be hereinafter more fully described in detail. The short arm of the beam 12 has a longitudinally extending slot 15 therein. A vertically extending bar 16 is received within the slot 15 and pivotally secured to the short arm of the beam 12. A guide bar 17 positioned below the scale beam 12 and having its inner end pivotally mounted as at 17' between the arms 11, the outer end of the guide bar 17 is slotted as at 18 to receive the lower end of the vertically extending bar 16 and pivotally associated therewith as indicated at 19. The upper end of the vertically extending bar 16 having a receptacle 20 secured thereon to support an egg 30, which may vary in weight, size, etc.

A curved gage bar 28 having a short leg 28' which is secured to the base 10, in longitudinal alinement therewith, and adapted to be received within the bifurcated portion of the scale beam 12 and between the spaced guide arms 12², respectively. The gage bar 28 has graduations 29 marked thereon and identified by numerals 19, 22, 24 and 26 which are symbolical of the different graduations with respect to the weight. A plurality of spaced rings 24 are secured to the underside of the gage beam 12 between the arms 11 and the gage bar 28. A plurality of rods or arms 21, 22 and 23 respectively, of different lengths are pivotally suspended from the rings 24; a plurality of disk-like weights 25 having apertures 25' therein and adapted to receive the arms 21, 22 and 23 therein, the arms having stops or keepers 26 on their lower ends to hold the weights 25 on the arms 21, 22 and 23. A plurality of hollow cylindrical members 27 of different heights arranged directly below the arms 21, 22 and 23, respectively, to receive the ends of the arms and stops 26 and permit the weights 25 to rest upon the upper ends of same.

It will be apparent form the foregoing description and accompanying drawings that the invention provides a very useful device for farmers and merchants in the egg business. When an egg such as indicated at 30 is placed within the receptacle 20 it will cause the scale beam 12 to move downwardly upon its pivots 13 between the arms 11, raise one or a plurality of the weights 25 and raise the lower end of the scale beam 12 to register with one of the graduations 29 on the gage bar 28 according to the weights to indicate the grade of the egg.

The invention is susceptible of various changes in its form, proportions and minor details of construction and the right is herein reserved to make such changes as properly fall within the scope of the appended claims.

Having thus described the invention, what is claimed is:—

1. An egg grading scale of the character described comprising a base having a pair of spaced parallel arms secured to the upper side thereof, a scale beam fulcrumed off center and between the arms and having a slot in one end thereof, a vertically extending shaft received within the slot and pivotally secured to the scale beam, the long arm of the scale beam being bifurcated at its end thereof, a curvilinear gage bar secured to the base adjacent the end of the long arm and adapted to be received within the bifurcated end portion, a plurality of weights, means for suspending the weights from the underside of the scale beam between the gage bar and the parallel arms, a plurality of weight receiving members positioned directly beneath the weights, and a receptacle carried by the upper end of the vertically extending shaft.

2. An egg grading scale of the character described comprising a base, a pair of spaced parallel arms secured to the upper side thereof, a scale beam fulcrumed off center between the parallel arms having its long arm bifurcated and its short arm slotted, respectively, a vertically extending shaft received within the slotted portion of short arm of the scale beam and pivotally secured thereon, a slotted guide bar having one end pivoted between the parallel arms and the other receiving the vertically extending shaft therein and pivotally secured therewith, a graduated curvilinear gage bar secured to the base and adapted to be received within the bifurcated portion of the long arm of the scale beam, a plurality of rods of different lengths suspended from the underside of the scale beam between the parallel arms and the gage bar, weights supported on the ends of the rods, a plurality of hollow cylindrical members of different heights positioned directly below the weights, and a receptacle carried by the vertically extending shaft to support an egg therein.

In testimony whereof we affix our signatures.

LEON SPIRO.
EDWARD T. WHITE.